United States Patent [19]
Hackett

[11] Patent Number: 5,819,268
[45] Date of Patent: Oct. 6, 1998

[54] METHOD AND SYSTEM FOR TESTING FOR EQUALITY/DIFFERENCE IN MULTIPLE TABLES OF A DATABASE

[75] Inventor: Thomas Paul Hackett, Poughkeepsie, N.Y.

[73] Assignee: International Business Machines Corporation, Armonk, N.Y.

[21] Appl. No.: 848,941

[22] Filed: May 2, 1997

Related U.S. Application Data

[63] Continuation of Ser. No. 370,314, Jan. 10, 1995, abandoned.

[51] Int. Cl.$^6$ .................................................. G06F 17/30
[52] U.S. Cl. .......................... 707/6; 707/3; 707/4; 707/7; 707/509
[58] Field of Search ........................................ 707/1–6, 7

[56] References Cited

U.S. PATENT DOCUMENTS

| | | | |
|---|---|---|---|
| 3,964,029 | 6/1976 | Babb | 395/800 |
| 4,290,115 | 9/1981 | Pitt et al. | 395/600 |
| 4,382,277 | 5/1983 | Glaser et al. | 395/650 |
| 4,422,158 | 12/1983 | Galie | 395/600 |
| 4,495,566 | 1/1985 | Dickinson et al. | 495/600 |
| 4,771,427 | 9/1988 | Tulpule et al. | 371/8 |
| 5,111,395 | 5/1992 | Smith et al. | 364/408 |
| 5,121,494 | 6/1992 | Dias et al. | 395/600 |
| 5,189,709 | 2/1993 | Wang et al. | 382/10 |
| 5,193,185 | 3/1993 | Lanter | 395/600 |
| 5,202,982 | 4/1993 | Gramlich et al. | 395/600 |
| 5,241,648 | 8/1993 | Cheng et al. | 395/600 |
| 5,261,093 | 11/1993 | Asmuth | 395/600 |
| 5,278,978 | 1/1994 | Demers et al. | 395/600 |
| 5,317,708 | 5/1994 | Edgar | 395/427 |
| 5,386,523 | 1/1995 | Crook et al. | 395/404 |
| 5,495,608 | 2/1996 | Autoshenkov | 395/603 |
| 5,537,589 | 7/1996 | Dalal | 395/600 |
| 5,539,902 | 7/1996 | Kaplan et al. | 395/600 |

FOREIGN PATENT DOCUMENTS 3152640  6/1991  Japan.

OTHER PUBLICATIONS

"Domain Vector Accelerator (DVA): A Query Accelerator for Relational Operations", Perrizo et al., IBM Corp, 1991 IEEE, Jun., 1991.

Wegman, S., "Set Equality Testing Technique", IBM Technical Disclosure Bulletin, vol. 21, No. 3, Aug. 1978.

"Method to Provide Software Calculation of a 32–Bit Frame Check Sequence, A Byte at a Time," IBM Technical Disclosure Bulletin, May, 1988. 458–464.

*Primary Examiner*—Thomas G. Black
*Assistant Examiner*—Hosain T. Alam
*Attorney, Agent, or Firm*—Heslin & Rothenberg, P.C.

[57] ABSTRACT

Methods and system for comparing tables of a database are set forth. Within each table are multiple rows, each row having multiple columns, each column having a datum contained therein. The methods include retrieving the datum from within each column of each row of each table, and determining a value for each row based upon the datum contained within the columns thereof. For each table, the values of the multiple rows are combined using a commutative function to produce a separate table result for each table. The table results are then compared to determine the probability of equality of the at least two tables.

12 Claims, 6 Drawing Sheets

METHOD AND SYSTEM FOR TESTING FOR EQUALITY/DIFFERENCE IN MULTIPLE TABLES OF A DATABASE

This application is a continuation of application Ser. No. 08/370,314, filed Jan. 10, 1995, now abandoned.

TECHNICAL FIELD

The present invention relates to techniques for processing computer databases. More specifically, the present invention relates to techniques for testing the equality of two database tables by comparing the contents thereof.

BACKGROUND OF THE INVENTION

Computer databases have gained widespread use in storing information. Processing of such databases with accuracy and efficiency has become increasingly important as the sizes thereof increase. In particular, certain operations performed on very large databases require large amounts of computer time, which is expensive. Thus, techniques for minimizing computer time required to perform operations on databases are desirable.

One type of database operation is a comparison of multiple tables within a database (or tables from separate databases). Typically, tables within a database contain at least one row which has one or more columns therein. In general, a comparison of two tables requires a comparison of the contents of the rows contained within the table. More specifically, as used herein, two tables are considered equal if they contain the same rows, irrespective of ordering within the table.

A traditional method for comparing two tables for equality comprises sorting the two tables, and then checking each row of one table against its corresponding row in the other table for equivalence (e.g., row 1 on both tables should be the same). Because this method relies on sorting each table, as the table size grows, the sorting becomes slower. Even with efficient sorting algorithms, the most efficient sort time would be a function of $\log(n^m)$ where n is the size of the sorting key and m is the number of elements of the set. Thus, such a method can be very computationally intensive and costly.

One application for testing table equality involves the testing of new database query engines ("query engines"). For example, a known reliable query engine can be used to run a query against a database and produce a first table as a result. A new query engine can then be used to run the same query against the same database to produce a second table as a result. By checking the two tables against each other for equality, the functionality of the new query engine is tested. Of course, a slow table comparison routine will limit the size of the tables that can be compared in a given time. Thus, speed limitations imposed by sort based comparison techniques restrict the size of test query results that may be used and thus, the overall robustness of such testing.

The present invention is directed to providing solutions to the above discussed problems and deficiencies of traditional techniques for testing database table equality.

DISCLOSURE OF THE INVENTION

Briefly described, in a first aspect, the present invention includes a method for testing the probability of equality of at least two tables of a database using a programmed computer. The programmed computer has a storage means within which the database is contained. Specifically, each table of the at least two tables of the database has multiple rows, with each row having at least one column. Each column within each row has a datum contained therein.

The method includes retrieving the datum contained within the columns of each row of each table of the at least two tables within the database from the storage means of the programmed computer. A value is then determined for each row of each table within the database as a predetermined function of the datum contained within each column thereof. For each table, the values for the multiple rows are combined using a commutative function to produce a separate table result. Thereafter, the separate table results are compared for the at least two tables of the database to test the probability of equality thereof.

As an enhancement, each row of the table may contain at least two columns. The method may then include combining the datum of each column of each row into a combined datum therefore. The determining step may then comprise determining a value for each row of each table within the database as a predetermined function of the combined datum of each row.

The above described method may also be used to verify the functioning of a first query engine against a second query engine. Specifically, first and second tables can be generated and stored using the first and second query engines, respectively. The aforementioned method is then used to compare the first and second tables in order to verify the functioning of the first query engine against the second query engine. If the tables are equal, the query engines are functioning the same.

In a further aspect, the present invention includes a method for determining the differences in at least two tables of a database using a programmed computer having a storage means. The method includes retrieving the datum contained within each column of each row of each table within the database from the storage means of the programmed computer. A value is then determined for each row of each table within the database as a predetermined function of the datum contained within each column thereof. These values associated with their respective rows as indicies which are then used to sort the tables. Each row in each sorted table is then compared to its corresponding row in each other sorted table to determine differences between the tables.

Further methods and systems in accordance with the techniques of the present invention are also described herein.

The techniques of the present invention have numerous advantages and features associated therewith. As one example, the techniques of the present invention generate table results using processing time according to a linear relationship to database size. In contrast, previous table compare techniques required processing time according to a geometric relationship to database size, which made the comparison of very large databases prohibitively time consuming. Thus, the present invention facilitates comparing larger tables than was previously possible, in a shorter period of time. Further, the table sorting and comparison techniques of the present invention facilitate sorting of the database tables such that unequal rows can be precisely identified.

When applied to the query engine test application described above, the techniques of the present invention facilitate more robust testing of the new query engine. This is due to the ability to test the new query engine on larger tables since the time and system requirements for such testing has been decreased. Moreover, the sort/compare techniques of the present invention facilitate the particular identification of rows on which the new query engine failed.

BRIEF DESCRIPTION OF THE DRAWINGS

The subject matter which is regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

BEST MODE FOR CARRYING OUT THE INVENTION

Figure 1:
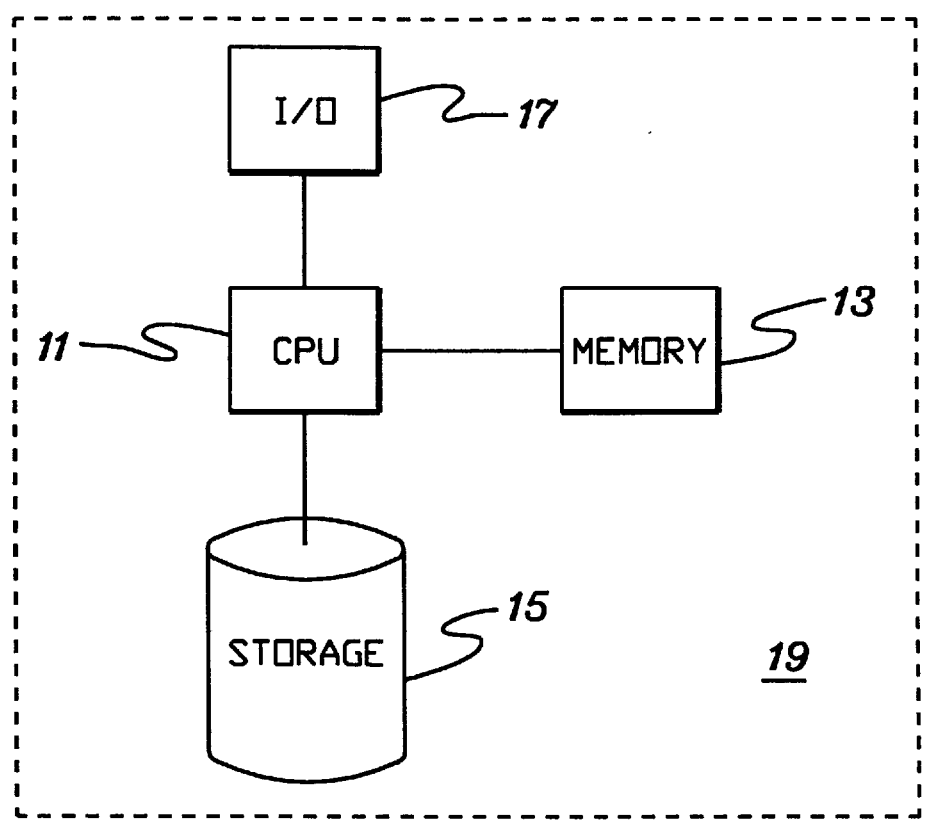
FIG. 1 is a block diagram of a computer system for comparing and sorting tables of a database according to an embodiment of the present invention.

The techniques of present invention facilitate the comparison of two tables within a database (such as a relational database) for equality. This comparison may be used in various applications such as the testing of database query engines. For example, two query engines are used to each generate a table based upon an identical query. Comparing the two tables is then performed by, for example, processing each row of each table using a predetermined function to produce a row value therefore (such functions are discussed further hereinbelow). After row values have been determined, for each table, they are combined using a commutative function to produce a table result for each table. The table results may then be compared to test the equality of the tables within the database. If the values of the table results are equal, the tables may be said to be equal with a high probability of certainty. Of course, this would indicate that both query engines are functioning identically. The level of certainty of equality of the tables depends mostly on the predetermined function used to process each row.

In that regard, if different inputs (rows) to the predetermined function produce the same outputs (results), a false equality may be indicated. Therefore, a consideration in choosing a predetermined function is the uniqueness of its output based on a certain input, i.e. different inputs should always produce different outputs. This is typically a limit of the predetermined function itself as well as the resolution of the output of the function. To further explain, if the output of the predetermined function is an 8-bit number, only 256 possibly output codes exist. However, if the predetermined function is provided with a 16-bit output, then 16,384 possible output codes exist. An increased number of output codes decreases the repetition of output codes given a certain set of inputs. Therefore, by increasing the resolution of the output of the predetermined function, the level of uniqueness of the predetermined function is increased. Accordingly, combinations of more unique outputs (values) yields a total result for a given table with higher uniqueness, and thus a more accurate comparison of the equality of tables. It is therefore apparent that by increasing the resolution of the predetermined function, the accuracy of the test for equality is increased.

If the comparison of the table results yields inequality, the tables are considered unequal. In contrast to the determination of equality, the determination of inequality is certain. To explain, while the predetermined function can, in rare instances, produce the same output for different inputs, the converse is not true. The predetermined function will never produce different outputs for the same input (absent computer malfunction). Therefore, if individual rows of tables differ, then the corresponding values will differ. Further, if the values of the two tables differ, the table results will differ. Thus, the determination of inequality between the tables is accurate.

An example of a predetermined function is a Frame Check Sequence ("FCS") function. One FCS function is described in the document entitled "Method to Provide Software Calculation of a 32-Bit Frame Check Sequence, a Byte at a Time," IBM Technical Disclosure Bulletin, May, 1988, p. 458–464, and hereby incorporated herein by reference. Other examples of predetermined functions that may be used are encryption functions and modification detection code ("MDC") functions. As will be apparent to one of ordinary skill in the art, any function having a high degree of input to output uniqueness may be used as the predetermined function of the present invention.

It should be generally noted that these predetermined functions (in contrast to, for example, hashing functions) do not produce an output that has an alphanumeric correspondence to their input. Thus, this class of functions is not useful in alphanumeric sorting of the tables.

As stated hereinabove, a commutative function is used to combine the values determined for each row to produce a table result for each table. Addition is one example of a commutative function. Another example of a commutative function is exclusive-or ("XOR"). Other commutative functions may be used, however, overall resolution of such functions must be considered during implementation. Further, it would be undesirable to have significant overflow, or other errors occur during the combination of the values.

The techniques of the present invention may be implemented using conventional computer technology. For example, a typical computer system is shown in FIG. 1. The computer system 19 includes central processing unit ("CPU") 11, input/output ("I/O") 17, memory 13 and storage 15 (e.g. disk or tape storage). A database (and tables contained therein) may be stored in storage 15 or memory 13 since both of these are means for storing data. Of course, conventional processing considerations such as the desired access speed and the size of the database will govern which storage means the database is contained within.

During table comparison/processing by CPU 11, the database tables are read and processed according to a program. Thus, when programmed, the computer constitutes a system for comparing tables of a database. Processing systems with the capabilities described hereinabove or equivalent may be used to implement the techniques of the present invention.

Figure 2:
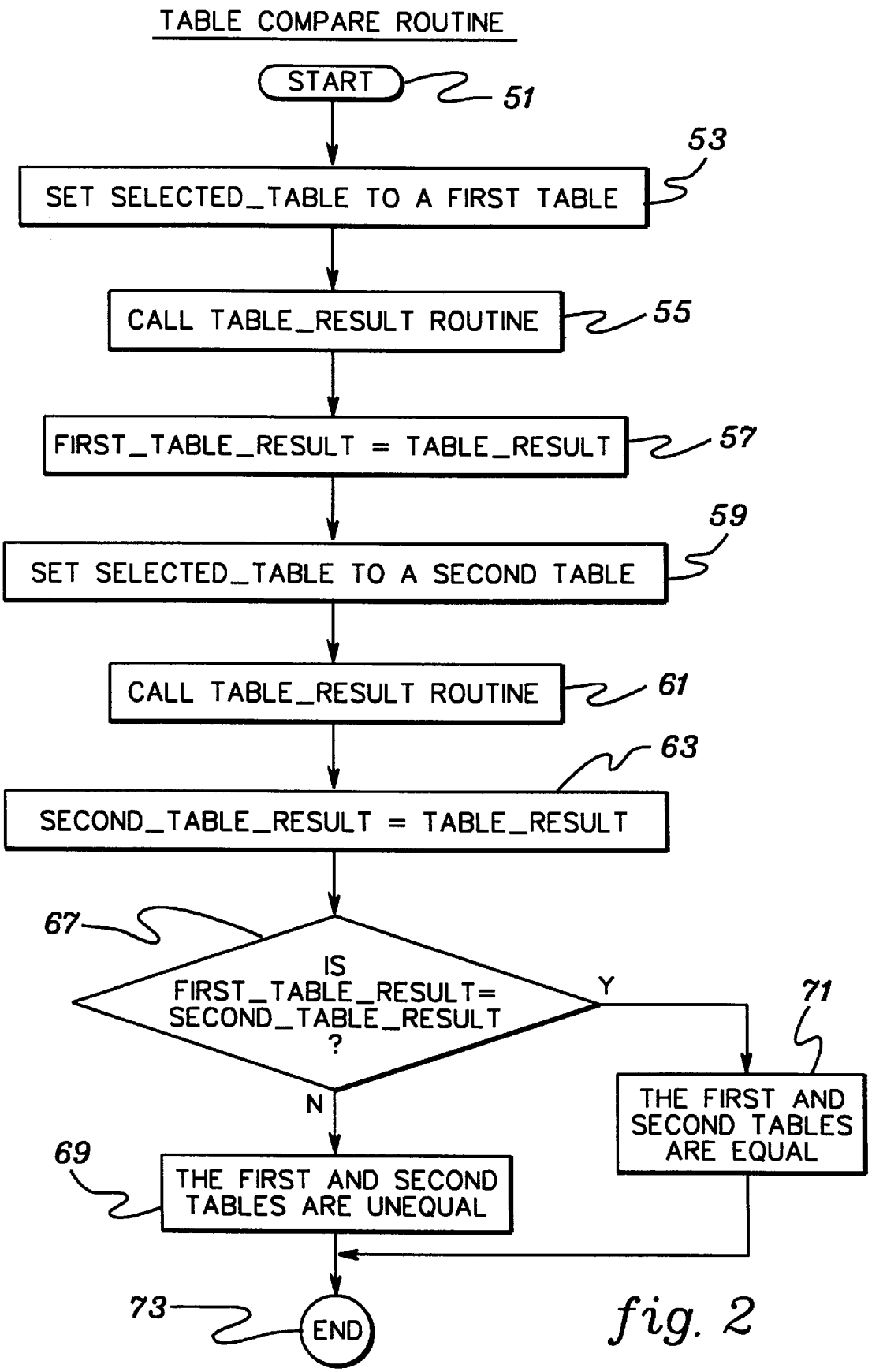
FIG. 2 is a flow diagram of a database table comparison routine pursuant to one embodiment of the present invention.

A method for implementing the database table comparison of the present invention is described hereinbelow with regard to the flow diagrams of FIGS. 2 and 3. Implementation of the individual steps of the method using conventional programming techniques will be apparent to one of ordinary skill in the art.

The method starts (step 51 of FIG. 2) with the designation of a first table within the database as the SELECTED_TABLE (53). The TABLE_RESULT Routine is then called (55) to determine the TABLE_RESULT for the first table (i.e. the SELECTED_TABLE). A variable FIRST_TABLE_RESULT is assigned the value of the TABLE_RESULT determined for the first table (57). The TABLE_RESULT routine is described in detail hereinbelow with regard to FIG. 3.

The TABLE_RESULT is next determined for a second table in the database. Specifically, SELECTED_TABLE is set to a second table in the database (59), and the TABLE_RESULT Routine is called (61). The TABLE_RESULT determined is then assigned to the SECOND_TABLE_RESULT variable (63). Thus, first and second table results have been determined.

After the TABLE_RESULTs for each table have been determined, they may be compared (67). If the TABLE_RESULTs are equal, then there is a high probability that the tables are equal (71). If TABLE_RESULTs are unequal, then the tables are not equal (69). Thus, a table comparison using the techniques of the present invention is completed (73).

As a variation, the techniques of the present invention can be extended to compare more than two tables for equality. As will be apparent to one of ordinary skill in the art, table results for n tables (n>1) may be generated and compared such that the equality of n tables may be determined.

Figure 3:
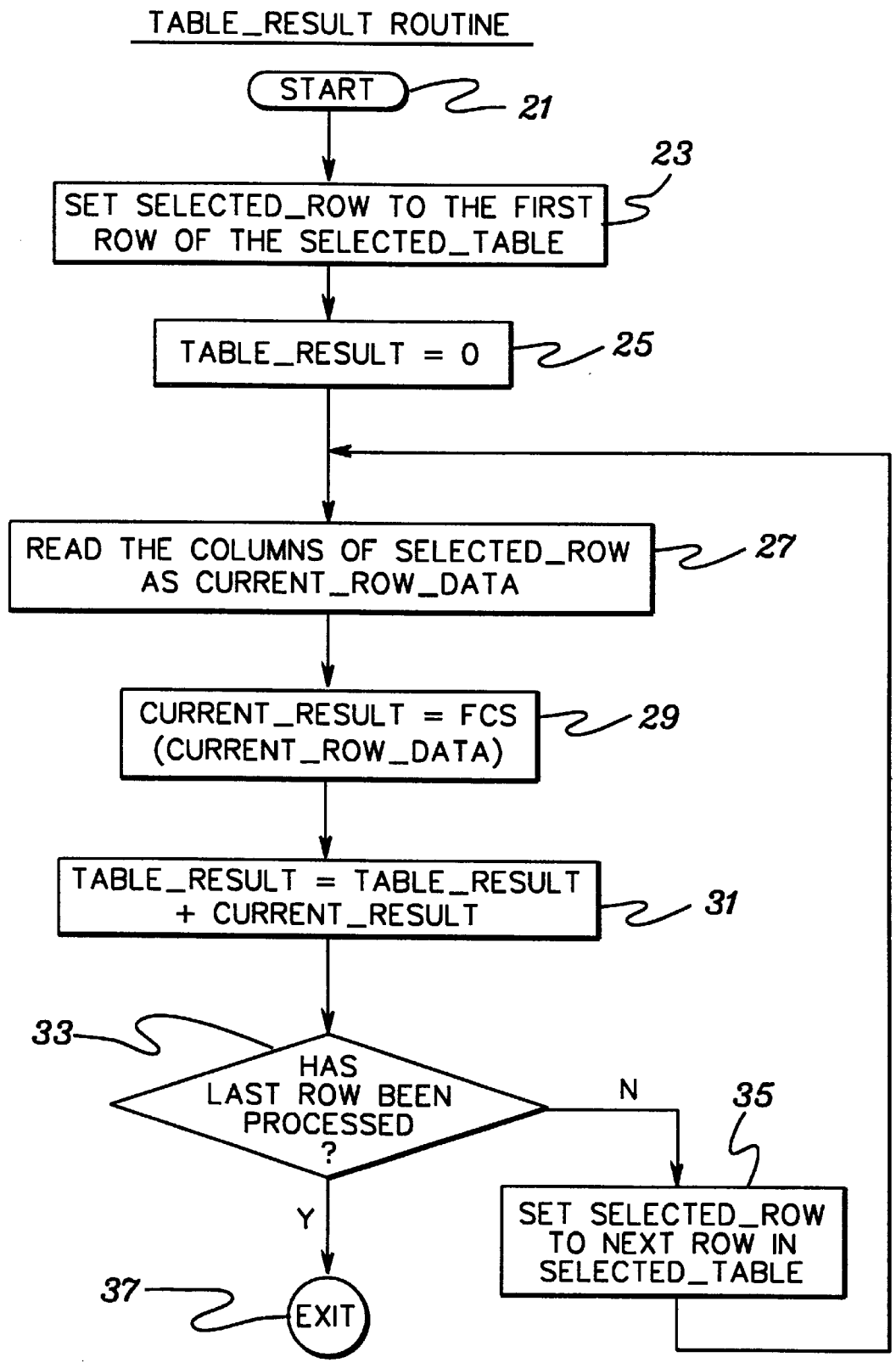
FIG. 3 is a flow diagram of a routine used to calculate a table result in conformance with an embodiment of the present invention.

As discussed hereinabove, the TABLE_RESULT Routine is used to determine the TABLE_RESULT for a selected table (FIG. 3). The routine starts (21) with the assignment of SELECTED_ROW to the first row of the selected table (23), and the initialization of the TABLE_RESULT variable to zero (25).

Next, the datum of each of the columns of the current row (initially the first row) are read as a single string variable into CURRENT_ROW_DATA (27). A Frame Check Sequence ("FCS") is then applied to CURRENT_ROW DATA and the result is stored in CURRENT_RESULT (29). Specifically, the datum of each of the columns of the selected row are combined into a combined datum and stored in CURRENT_ROW_DATA such that the FCS function processes the datum associated with every column of the row during this step.

The TABLE_RESULT is then increased by the value of CURRENT_RESULT (31). The increasing is performed by addition which is, in this example, the commutative function used to combine the values for each row. Of course, other commutative functions may be substituted for addition as discussed hereinabove.

A test is next performed to determine whether the last row has been processed (33). If not, the SELECTED_ROW is set to the next row in the table (35) and the process is repeated starting with the reading of the selected row into CURRENT_ROW_DATA (27). If the last row of the table has been processed, the process ends (37), passing the value of TABLE_RESULT to the calling routine.

Variations on the above described method are possible in accordance with the techniques of the present invention. For example, variations on when the rows of the tables are processed are possible. As one example, as a particular database query generates one of the tables, the value for each row of the table may be calculated (e.g., FCS) as it is output in response to the query. This method eliminates the need to re-traverse the rows and columns of the table to calculate the TABLE_RESULTs after the query has completed.

As further variations, the FCS may be replaced with an alternate predetermined function. As discussed hereinabove, candidate functions include encryption functions as well as modification detection code functions. Further, the commutative function of addition used to combine the values associated with each row into a Table_Result (step 31) may be replaced with other commutative functions. As one previously mentioned example, exclusive-or may be used as the commutative function.

Figure 4:
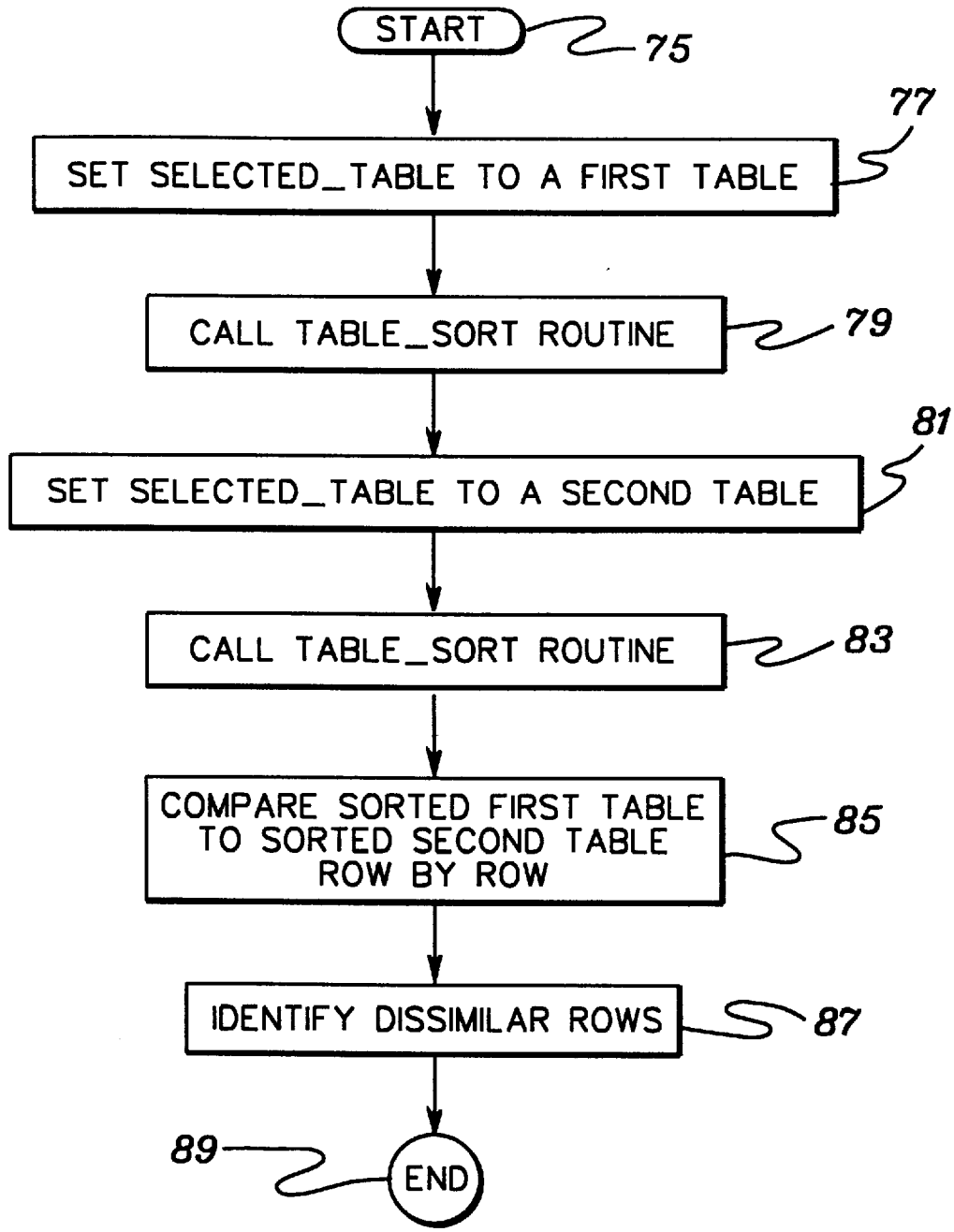
FIG. 4 is a flow diagram of a routine used to identify unequal rows in accordance with one embodiment of the present invention.

Further variations of the techniques of the present invention may be used to sort tables within a database. One use for such a sorting would be to identify the specific mismatched rows within compared tables. A method for implementing such a sort and comparison is shown in the flow diagrams of FIGS. 4 and 5.

The method begins (step 75 of FIG. 4) with the designation of a first table within the database as the SELECTED_TABLE (77). The TABLE_SORT Routine is then called (79) to determine indices and sort the first table. Similarly, SELECTED_TABLE is set to a second table in the database (81), and the TABLE_SORT Routine is called (83) to calculate indices and sort the second table. The TABLE_SORT routine is described further hereinbelow with regard to FIG. 5. Although sorting of the tables is not necessary for the equality testing discussed hereinabove, sorting is used in the determination of which rows are unequal amongst unequal tables.

After the first and second tables have been sorted, the rows thereof may be compared (85). Specifically, a row by row comparison of corresponding rows is performed such that any mismatched rows are identified. For example, the first rows of both tables are compared, then the second rows, then the third rows, etc. Thus, specific instances of dissimilarity between the tables may be identified (87), and the routine is completed (89). As a general note, in regard to the example application of testing a new query engine described hereinabove, erroneous query results of the new query engine can be identified in this manner with particularity.

Figure 5:
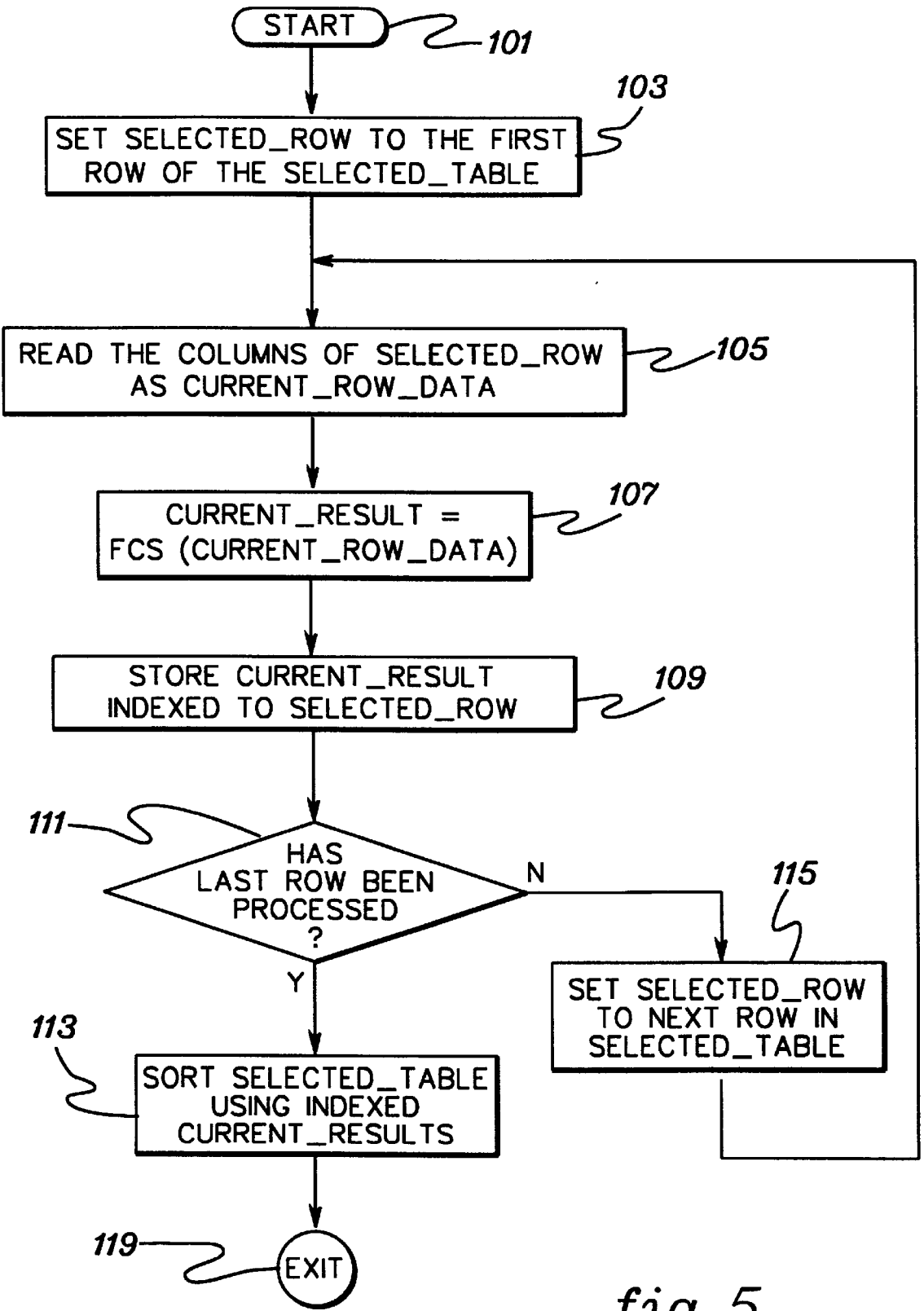
FIG. 5 is a flow diagram of a table sort routine pursuant to an embodiment of the present invention.

The TABLE_SORT Routine is used to determine indices for each row of the selected table and then sort the table based thereon (FIG. 5). The routine starts (101) with the assignment of SELECTED_ROW to the first row of the selected table (103). Next, the datum of each of the columns of the current row (initially the first row) are read as a combined datum into CURRENT_ROW_DATA (105) and an FCS function is applied thereto with the result being stored in CURRENT_RESULT (107). The CURRENT_RESULT is then stored, and indexed to the SELECTED_ROW. This may be done, for example, by storing CURRENT_RESULT in a database field associated with the current row using conventional relational database techniques. Such an association is later used in sorting the table.

The above described procedure is repeated until the last row of the table has been processed. Specifically, a test is performed to determine whether the last row has been processed (111). If not, the SELECTED_ROW is set to the next row in the table (115) and the-process is repeated starting with the reading of columns of the selected row into CURRENT_ROW_DATA (105). If the last row of the table has been processed, the table is sorted using the indexed CURRENT_RESULTS (113) and the routine ends (119). Thus, methods have been described which compare two database tables for equality and identify unequal rows if the tables are not equal.

As discussed hereinabove with respect to the table comparison techniques, the unequal row identification techniques of the present invention may be extended to more than two tables. As will be apparent to one of ordinary skill in the art, the indexing and sorting steps applies to each of the two tables may be applied to a third table. Then, the corresponding rows in each of the three tables may be compared to identify unequal rows.

Figure 6:
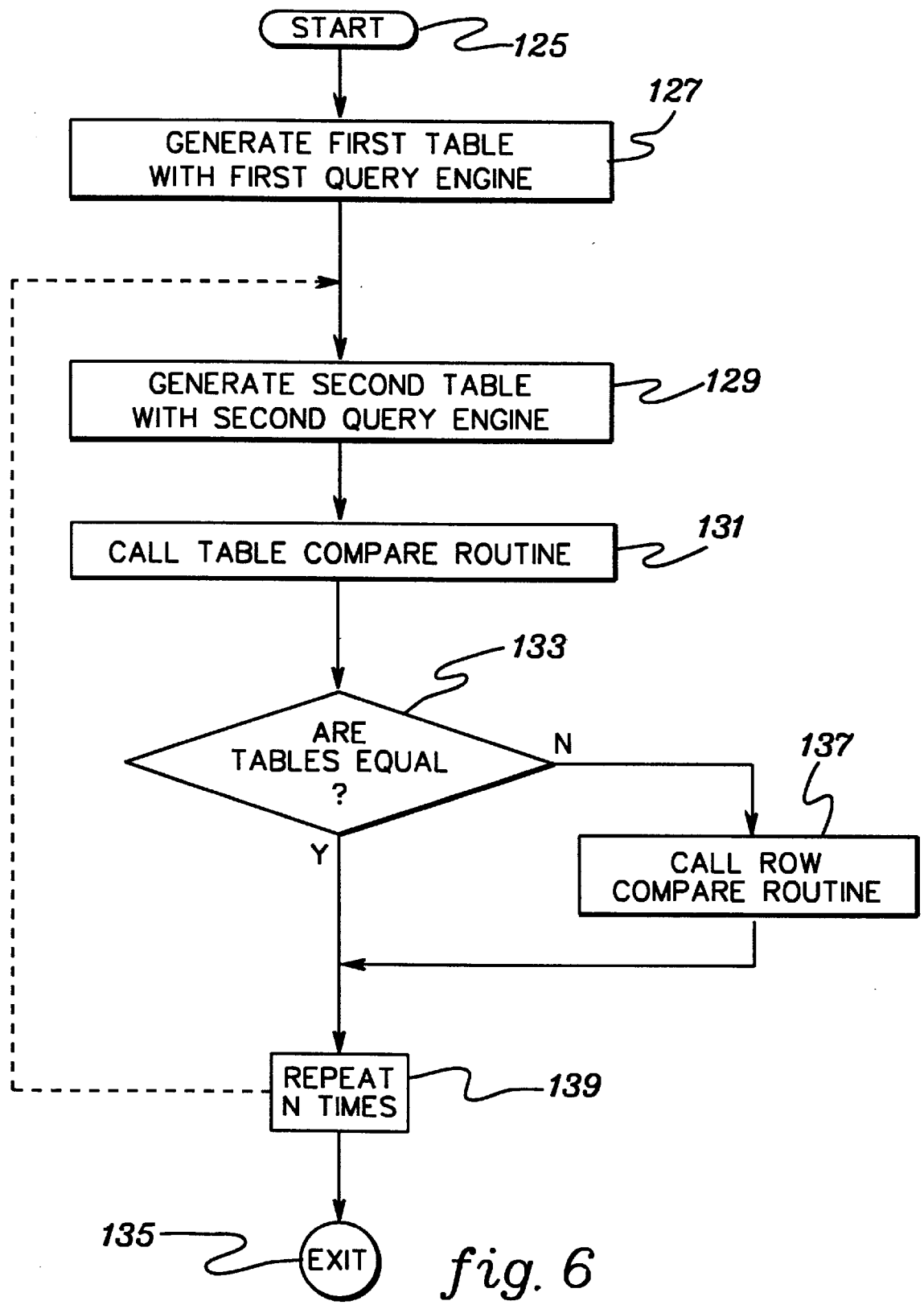
FIG. 6 is a flow diagram of a routine used to test a database query engine in conformance with the present invention.

The techniques of the present invention are applicable to the testing of a new query engine (FIG. 6—step 125) as discussed hereinabove. Specifically, for example, if a first query engine is to be verified against a second query engine, each query engine is used to produce a table from a common query. For example, a first table is generated by the first query engine (127), and a second table is generated by the second query engine (129). Of course, if the query engines both function identically then the resulting tables should be the same.

In order to verify the identical functioning of the two query engines, the two tables discussed above are used as the first and second tables of the table compare routine (131). If the query engines function identically (133), the table compare routine should indicate that the tables are in fact equal. If however the tables are indicated to be unequal, then the row compare routine (137) may be used to identify the exact rows that are unequal.

As a variation, if repetitive testing of a new query engine is desired, a more rigorous test is possible. For example, the first table may have been generated by a known good query engine, while the second table may have been generated by a new query engine under test. The table compare routine may be repeatedly executed (139), but with a new second table generated each time (129). After N iterations, the routine ends (135). Thus, the expense of regenerating the first "reference" table is saved, while the new query engine is repeatedly and thus thoroughly exercised.

In summary, the techniques of the present invention have numerous advantages and features associated therewith. As one example, the techniques of the present invention generate table results using processing time according to a linear relationship to database size. In contrast, previous table compare techniques required processing time according to a geometric relationship to database size, which made the comparison of very large databases prohibitively time consuming. Thus, the present invention facilitates comparing larger tables than was previously possible, in a shorter period of time. Further, the table sorting and comparison techniques of the present invention facilitate sorting of the database tables such that unequal rows can be precisely identified.

When applied to the query engine test application described above, the techniques of the present invention facilitate more robust testing of the new query engine. This is due to the ability to test the new query engine on larger tables since the time and system requirements for such testing has been decreased. Moreover, the sort/compare techniques of the present invention facilitate the particular identification of rows on which the new query engine failed.

While the invention has been described in detail herein, in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for testing the probability of equality of at least two tables of a database using a programmed computer having a storage means, said database being contained within said storage means, each table of said at least two tables having multiple rows, each row of said multiple rows having at least two columns, each column within each row having a datum contained therein, said method comprising the steps of:
    (a) retrieving the datum contained within each column of each row of each table of said at least two tables within the database from the storage means of the programmed computer;
    (b) determining a value for each row of each table of said at least two tables within the database as a predetermined function of a single string variable generated by concatenating datum contained within multiple columns of the at least two columns thereof;
    (c) for each table, combining the values for the multiple rows thereof using a commutative function to produce a separate table result for said table; and
    (d) comparing said separate table results for the at least two tables of the database to test said probability of equality of the at least two tables of the database.

2. The method of claim 1, wherein said determining step (b) comprises determining a value for each row of each table within the database as the predetermined function of the concatenated datum, wherein the value is uncorrelated to alpha-numeric ordering of the concatenated datum.

3. The method of claim 1, wherein said combining step (c) comprises combining the values for the multiple rows of each table within the database using addition or an exclusive-or function to produce said separate table result for each table within the database.

4. The method of claim 1, wherein said determining step (b) comprises determining the value for each row of each table using a frame check sequence applied to the datum contained within each column thereof.

5. The method of claim 1, wherein said combining step (c) for the values further comprises combining the values for each row of each table as they are determined in said determining step (b).

6. The method of claim 1, wherein said database comprises a relational database, said retrieving step (a) including retrieving the datum contained within each column of each row of each table within the relational database from the storage means of the programmed computer.

7. A method for determining differences in at least two tables of a database using a programmed computer having a storage means, said database being contained within said storage means, each table of said at least two tables comprising multiple rows, each row having at least two columns, each column within each row having a datum contained therein, said method comprising the steps of:
    (a) retrieving the datum contained within each column of each row of each table of said at least two tables within the database from the storage means of the programmed computer;
    (b) determining a value for each row of each table of said at least two tables within the database as a predetermined function of a single string variable generated by concatenating datum contained within multiple columns of the at least two columns thereof;
    (c) associating as an index, with each row, its respective value of said step (b);
    (d) sorting each table using said indicies to produce sorted tables; and (e) comparing each row in each sorted table to its corresponding row in each other sorted table to determine differences in said at least two tables.

8. The method of claim 7, wherein said determining step (b) comprises determining a value for each row of each table of said at least two tables within the database as a non-alphanumerical correlated predetermined function of the datum contained within each column thereof, such that said sorting step (d) comprises sorting each table using said stored values as indices to produce non-alphanumerically sorted tables.

9. A method for verifying the functioning of a first query engine against a second query engine using a programmed computer having a storage means, said method comprising the steps of:

(a) generating and storing a first table of a database using said first query engine, said storing of said first table being within said storage means of said programmed computer, said first table having multiple rows, each row having multiple columns, each column having a datum contained therein;

(b) generating and storing a second table of a database using said second query engine, said storing of said second table being within said storage means of said programmed computer, said second table having multiple rows, each row having multiple columns, each column having a datum contained therein;

(c) retrieving the datum contained within each column of each row of said first table and the datum contained within each column of each row of said second table from the storage means of the programmed computer;

(d) for each of said first table and said second table, determining a value for each row of each table as a predetermined function of a single string variable generated by concatenating datum contained within at least two columns of the multiple columns thereof;

(e) combining the values determined in said step (d) for the multiple rows for the first table using a commutative function to produce a first table result;

(f) combining the values determined in said step (d) for the multiple rows for the second table using the commutative function to produce a second table result; and (g) comparing said first table result and said second table result to verify the functioning of the first query engine against the second query engine.

10. The method of claim 9, said method including repeating said steps (b)–(g) multiple times for repeatedly verifying the functioning of the second query engine.

11. The method of claim 10, wherein said generating step (a) includes pre-performing said generating step (a) and retaining said first table as a reference table.

12. A system for testing the probability of equality of at least two tables of a database using a programmed computer having a storage means, said database being contained within said storage means, each table of said at least two tables of said database having multiple rows, each row having at least two columns, each column within each row having a datum contained therein, said system comprising:

means for retrieving the datum contained within each column of each row of each table of said at least two tables within the database from the storage means of the programmed computer;

means for determining a value for each row of each table of said at least two tables within the database as a predetermined function of a single string variable generated by concatenating datum contained within multiple columns of the at least two columns thereof;

means for combining, for each table, the values for the multiple rows thereof using a commutative function to produce a separate table result for said table; and means for comparing said separate table results for the at least two tables of the database to test said probability of equality of the at least two tables of the database.

* * * * *